(12) United States Patent  (10) Patent No.: US 6,535,367 B1
Carpenter et al.  (45) Date of Patent: Mar. 18, 2003

(54) ELECTRICAL PATCHING SYSTEM

(75) Inventors: Bryan J. Carpenter, Tarzana, CA (US); Glen Garrard, Glendale, CA (US)

(73) Assignee: Bittree Incorporated, Glendale, CA (US)

( * ) Notice: Subject to any disclaimer, the term of this patent is extended or adjusted under 35 U.S.C. 154(b) by 0 days.

(21) Appl. No.: 09/593,278

(22) Filed: Jun. 13, 2000

(51) Int. Cl.[7] ................................................ H02H 3/00
(52) U.S. Cl. ............................ 361/42; 361/58; 361/115
(58) Field of Search .............................. 361/42, 115, 58

(56) References Cited

U.S. PATENT DOCUMENTS

| | | |
|---|---|---|
| 3,052,842 A | 9/1962 | Frohman et al. |
| 3,188,524 A | 6/1965 | Williams |
| 4,080,040 A | 3/1978 | Lancaster |
| 5,145,380 A | 9/1992 | Holcomb et al. |
| 5,550,755 A * | 8/1996 | Martin et al. ........... 364/514 R |
| 5,552,962 A | 9/1996 | Feustel et al. |
| 5,575,665 A | 11/1996 | Shramawick et al. |
| 5,997,311 A | 12/1999 | Crouse et al. |

* cited by examiner

*Primary Examiner*—Stephen W. Jackson
(74) *Attorney, Agent, or Firm*—J. E. Brunton

(57) ABSTRACT

By way of summary, in the preferred form of the invention, the patch panel comprises a manually programmable device that incorporates shunts or dip switches that are readily accessible from the front panel of the device. In the patch panel construction of the invention, a multi-pin connector block is connected to a first circuit board that, in turn, is connected to a second circuit board via a cable connector, thus allowing the signal switching (normalizing) and grounding circuits of the respective jacks to be selectively altered from the front access panel of the device. By manually changing the shunt or dip switch configurations, the respective normalizing and grounding circuits can easily and simply be altered as may be desired without costly system interruption.

10 Claims, 8 Drawing Sheets

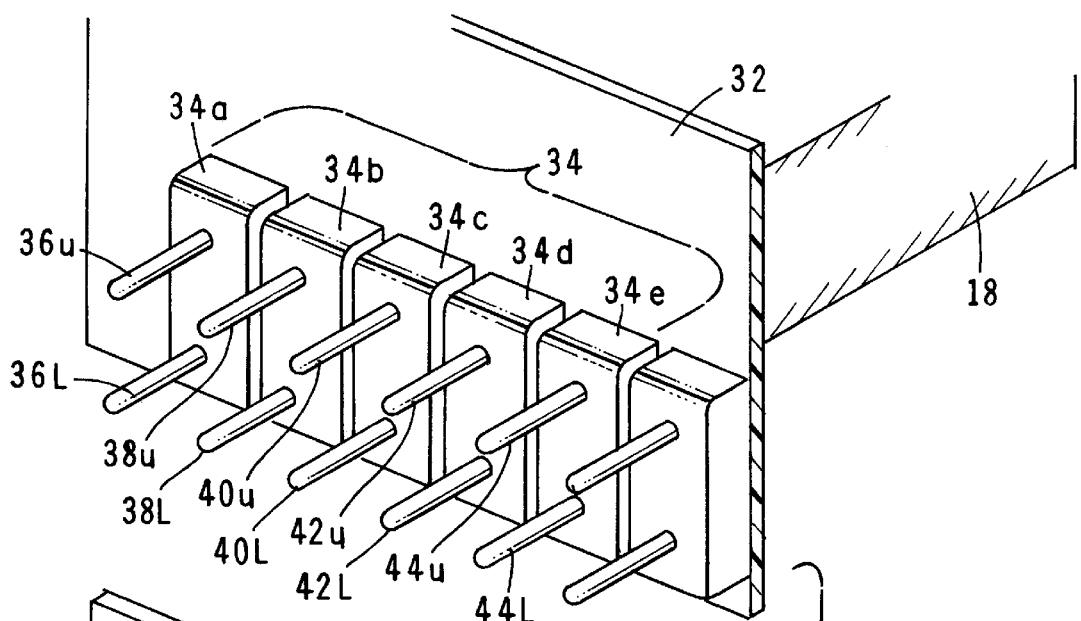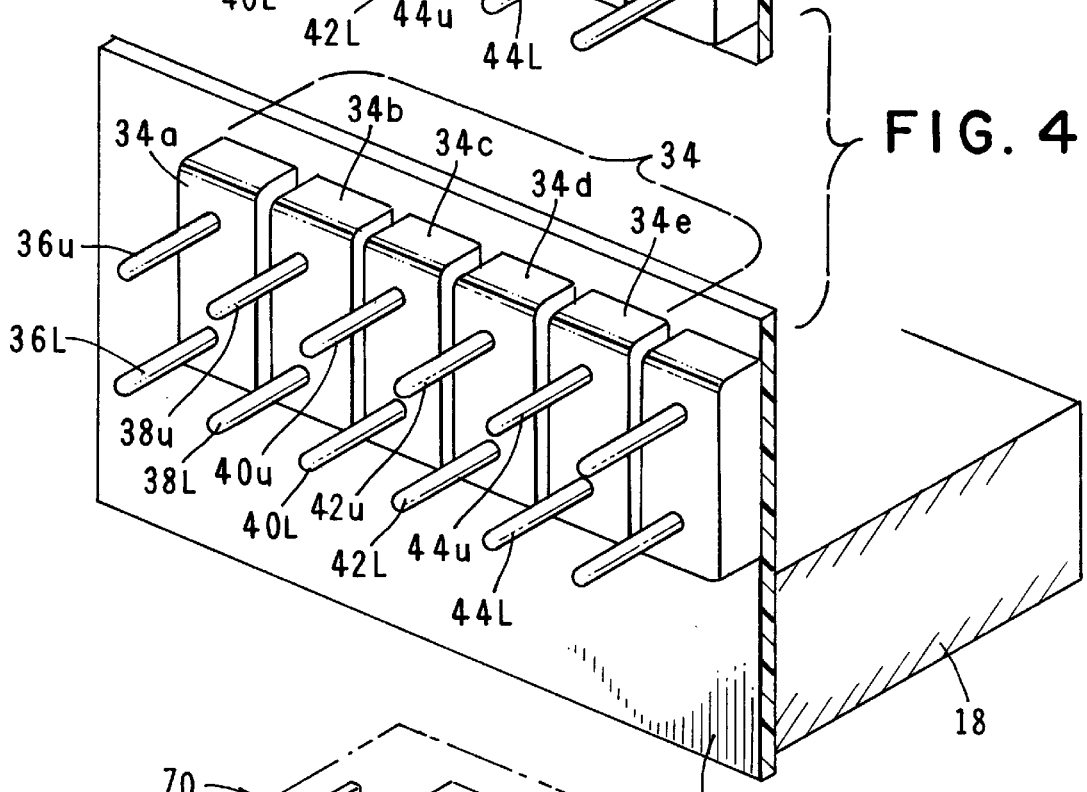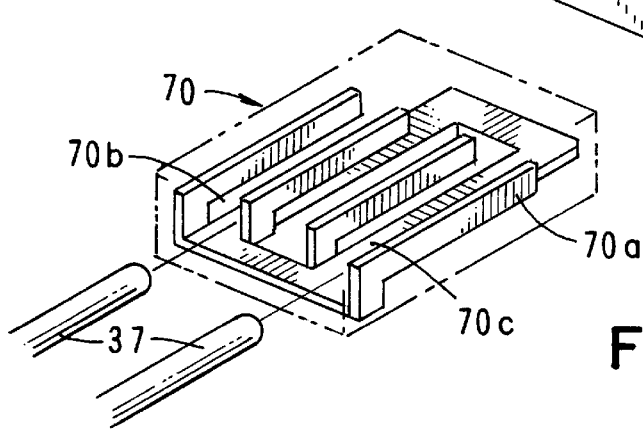
FIG. 4
FIG. 5

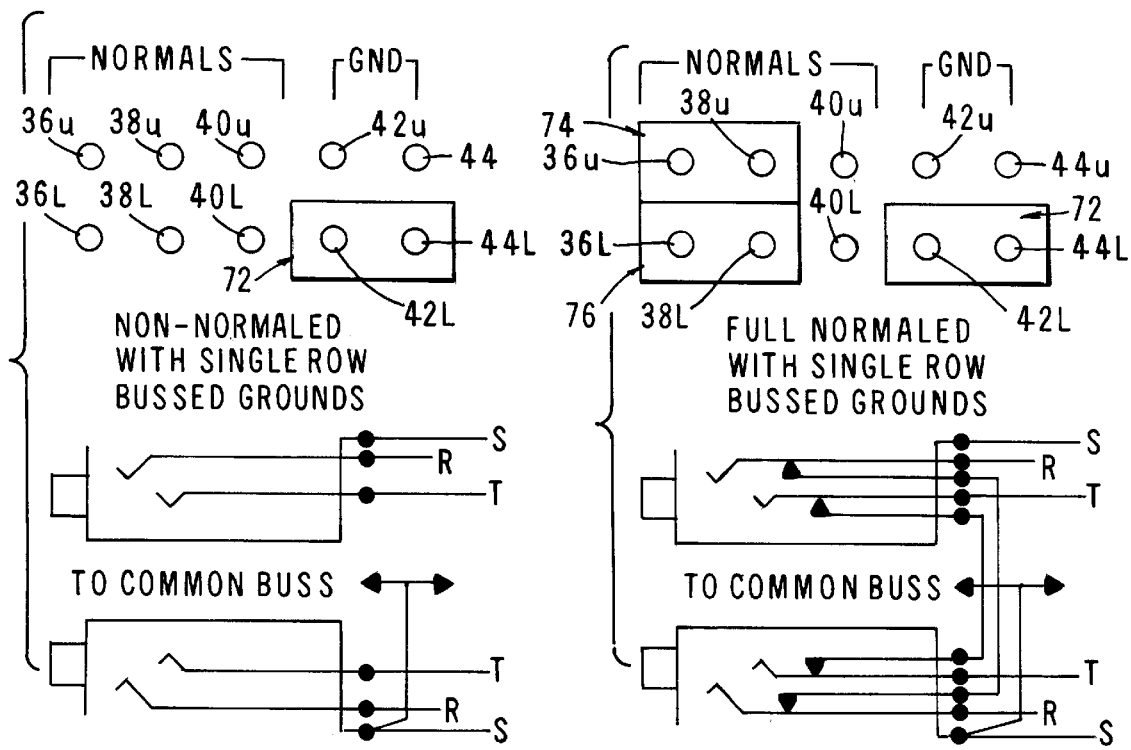
FIG. 5I
FIG. 5J
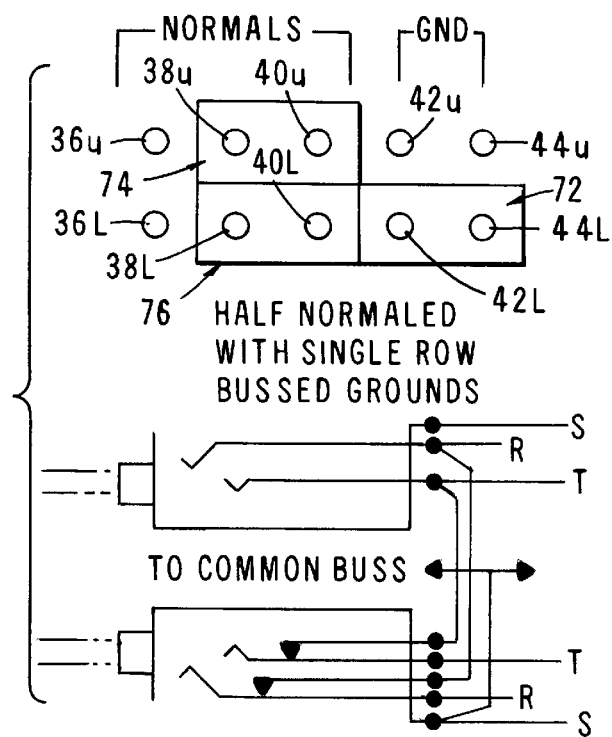
FIG. 5K

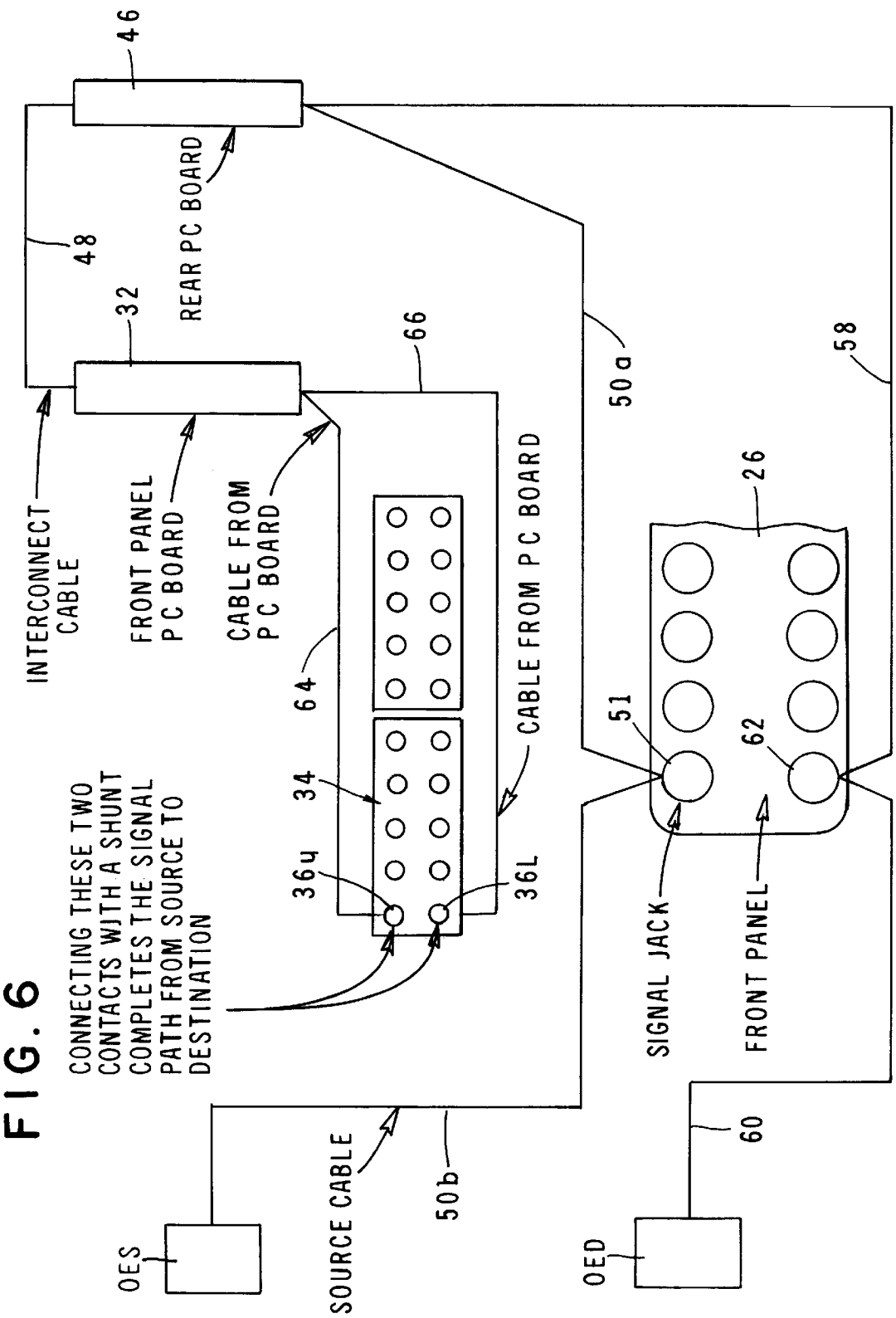

ELECTRICAL PATCHING SYSTEM

BACKGROUND OF THE INVENTION

1. Field of the Invention

The present invention relates generally to electrical systems. More particularly, the invention concerns a patching device for use in connection with communication systems that permits altering the signal flow paths within selected normalizing and grounding circuits of the communication system from the front panel of the patching device.

2. Discussion of the Prior Art

Electrical patching equipment is widely used in a variety of different applications for selectively connecting and disconnecting electrical circuits. By way of example, electrical patching equipment is frequently used to make selected circuit connections between a number of types of electrical equipment. More particularly, present day professional communication systems, which include telecommunication, production, post-production, media storage and other devices utilizing transmission equipment, typically embody patch panels for temporarily connecting various circuits. A patch panel or patch board is a device having a number of jacks at which circuits are terminated. In use, patch cords are plugged into the jacks to temporarily connect the selected circuits.

Modem day communication systems have numerous work stations and production rooms. In most cases being able to access the equipment inputs and outputs becomes essential. Accordingly, communication system users have long recognized the need for quick access patch panels for flexibility in setup requirements, and have realized the need for a manual patch panel even if it is used only for a service loop, backing up an active router system.

In practice, it is highly desirable for communication system users to have a patch panel with numerous electrical configuration possibilities. Location of equipment, adding new equipment and rearranging studio work environments makes it particularly inviting to have quick and easy access to the normalizing and grounding circuits on the patch panel. In addition, it is most desirable in practice to have connect and disconnect capability of the normalizing and grounding circuits for circuit tracing and troubleshooting. However, prior art patch panels of conventional design do not permit altering of the signal paths of either normalized or grounding circuits without shutting down the system and removing the patch panel from the equipment rack. It is this drawback of the prior patch panels that is uniquely overcome by the apparatus of the present invention.

SUMMARY OF THE INVENTION

It is a primary object of the present invention to provide an improved patch panel for use with a communication system that provides a simple and convenient means for altering selected normalizing and grounding circuits of the communication system without costly system interruption.

Another object of the invention is to provide an apparatus of the aforementioned character in which specially constructed banks of contacts, which are readily accessible from the front of the patch panel, can be selectively interconnected to program a particular circuit to full, half, or non-normal and can also be selectively interconnected to program the grounding of a circuit without costly equipment shutdown and without the necessity of removing the patch panel from the equipment rack.

Another object of the invention is to provide an apparatus as described in the preceding paragraph in which the contacts are provided in the form of ten-pin header assemblies, the pins of which can be selectively interconnected from the front panel using small, easy-to-manipulate shunts.

By way of summary, in the preferred form of the invention, the patch panel comprises a manually programmable device that incorporates shunts or dip switches that are readily accessible from the front panel of the device. In the patch panel construction of the invention, a multi-pin connector block is connected to a first circuit board that, in turn, is connected to a second circuit board via a cable connector, thus allowing the signal switching (normalizing) and grounding circuits of the respective jacks to be selectively altered from the front access panel of the device. By manually changing the shunt or dip switch configurations, the respective normalizing and grounding circuits can easily and simply be altered as may be desired without costly system interruption.

BRIEF DESCRIPTION OF THE DRAWINGS

FIG. 4 is a greatly enlarged, generally perspective view of a group of the upper and lower contacts of the apparatus.

FIG. 5 is a generally perspective view of a group of contacts similar to FIG. 4, and further illustrating the manner of interconnection of the contacts within the system.

FIG. 5I is a generally schematic view of a bank of contacts with one shunt connecting a pair of adjacent lower ground contacts to provide a non-normaled with single row bussed grounds connection.

FIG. 5J is a generally schematic view of a bank of contacts with a pair of shunts, each connected to a pair of adjacent end normals and one shunt connecting a pair of adjacent lower ground contacts to provide a full normaled with single row bussed grounds connection.

FIG. 5K is a generally schematic view of a bank of contacts with a pair of shunts, each connecting a pair of adjacent intermediate normals and one shunt connecting a pair of adjacent upper ground contacts to provide a half normaled with single row bussed grounds connection.

FIG. 6 is a generally schematic view illustrating the interconnection of the various components of the patch panel.

DESCRIPTION OF THE INVENTION

Figure 1:
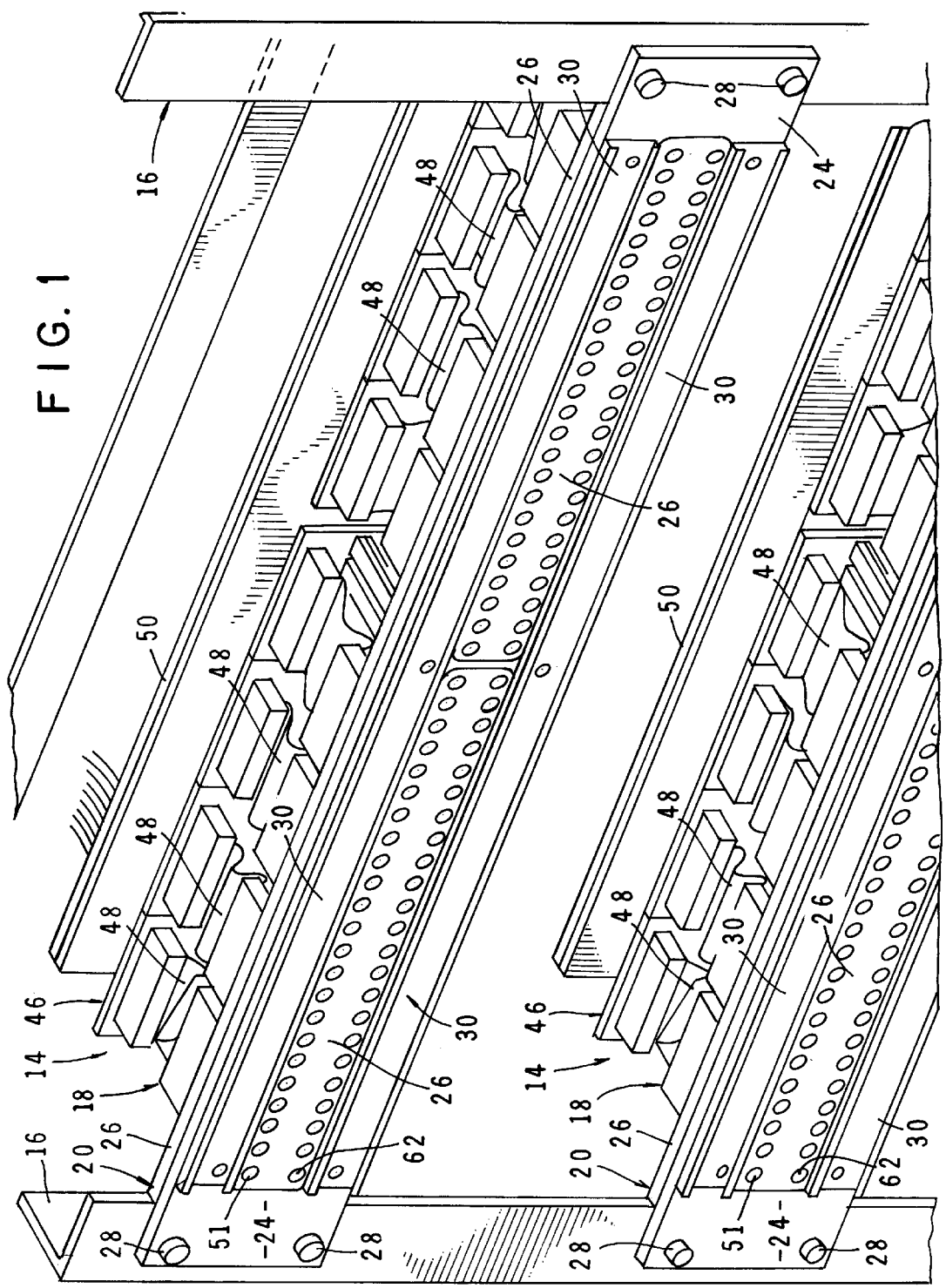
FIG. 1 is a generally perspective view of a pair of electrical patching systems of the invention mounted on a conventional equipment rack.
Figure 2:
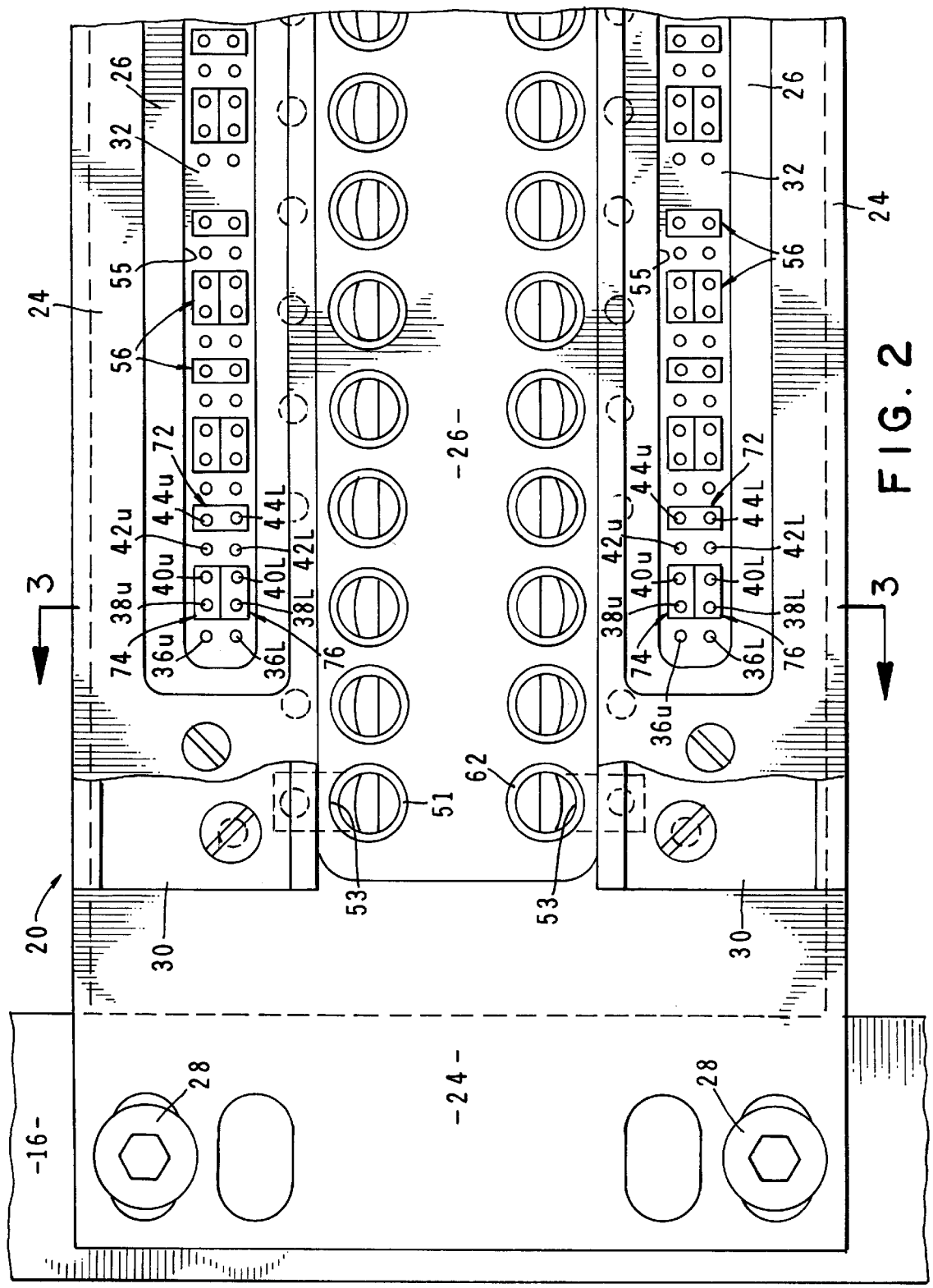
FIG. 2 is an enlarged, fragmentary front view of one of the patching systems shown in FIG. 1 with the designation strips that overlay the banks of contacts of the apparatus removed.
Figure 3:
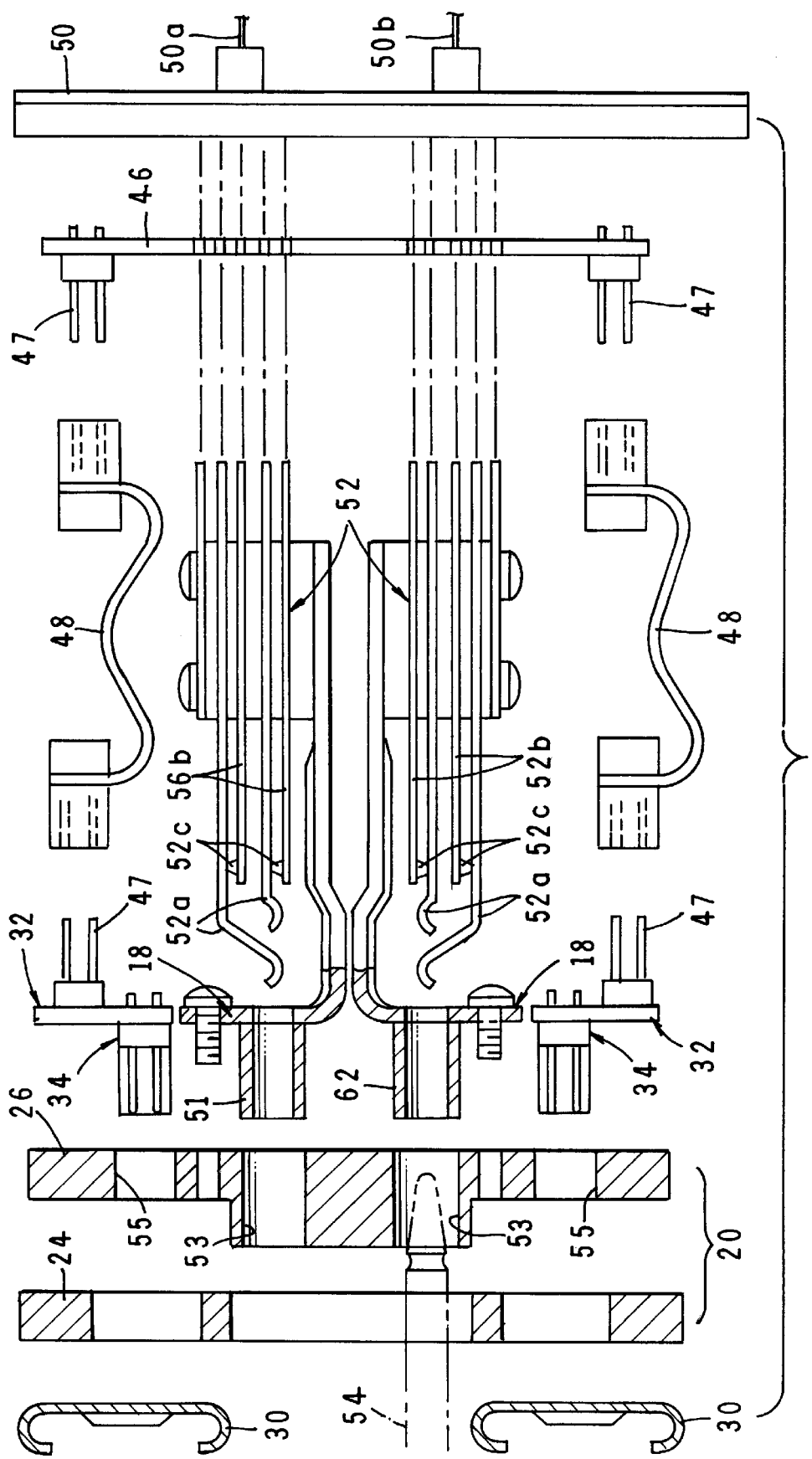
FIG. 3 is an enlarged, cross-sectional view taken along lines 3—3 of FIG. 2.

Referring to the drawings and particularly to FIGS. 1, 2 and 3, one form of the programmable patch panel of the invention is there shown. More particularly, FIG. 1 shows a pair of the panels 14 of the invention mounted in a conventional equipment rack 16. As best seen by referring to FIGS. 1 and 3, the patch panels 14 are of identical construction and each comprises a chassis 18 having a front panel assembly 20 that is made up of a front mounting plate 24 and an insulator panel 26. As depicted in FIG. 1, mounting plate 24 is connected to equipment rack 16 by means of threaded connectors 28. Removably connected to each mounting plate 24 is a pair of vertically spaced designation strips 30 that are adapted to carry designation indicia that identify the various electrical circuits carried by chassis 18.

Connected to the insulator panel of each of the patch panels 14 is a circuit board 32 having a plurality of circuits to which a plurality of transversely spaced apart ten-pin header assemblies 34 are connected (FIG. 3). As shown in FIG. 4, each header assembly 34, which comprises a part of the programming means of the invention, includes two upper and lower banks of pins, each having five spaced-apart pins that are connected to five insulator blocks 34a, 34b, 34c, 34d and 34e. In the drawings the contacts of the upper and lower banks are identified by the indicia 36u, 36L, 38u, 38L, 40u, 40L, 42u, 42L, 44u, and 44L. In the manner illustrated in FIG. 6 and as well understood by those skilled in the art, the pins or contacts of each five pin bank can be electrically interconnected with the electrical circuits carried by circuit board 32 using appropriate connector cables. As will presently be described, a plurality of shunts can be selectively connected to the aforementioned contacts to alter circuitry signal flow via the upper and lower banks of five pins or contacts of each of the ten-pin header assemblies 34.

Turning once again to FIG. 3, it is to be noted that circuit board 32 is electrically connected to a rearwardly disposed circuit board 46 having a plurality of circuits by connector pins 47 and by means of ribbon connectors 48. Circuit board 46 is, in turn, connected to a rear panel 50 which cooperates with the circuit board to form a rear interface to which the signal inputs of a plurality of different types of outboard equipment sources OES can be connected. The outboard equipment, such as video and audio tape players and other analog or digital media sources, can be connected to the rear interface via the source cables, such as cables 50a and 50b which, in turn, are connected to a selected signal jack 51 (see FIG. 6 which illustrates, by way of example, the interconnection of one OES, such as a tape player, with one destination device, such as a tape recorder).

Disposed between circuit boards 32 and 46 and suitably interconnected therewith are transversely spaced-apart stacks of leaf springs generally designated in the drawings by the numeral 52. Each of these stacks comprises a plurality of leaf springs 52a and 52b, the latter having switch contacts 52c. Stacks 52 are of a conventional, readily commercially available construction and can be selectively electrically coupled with selected circuits of the communication system using conventional patch cords 54 (FIG. 2). As indicated in FIG. 3, the jack sleeves 51 as well as the ten-pin header assemblies 34 extend through openings 53 and 55 respectively formed in insulator panel 26 and are readily accessible from the front panel assembly 20. In a manner presently to be described, when the designation strips 30 are removed from the mounting plate 24, the contacts or pins that make up the upper and lower ten-pin header assemblies 34 are easily accessible to the user so as to permit the selective interconnection therewith of one or more shunts 56 which shunts comprise one form of the connector means of the invention. Shunts 56 also comprise a part of the programming means of the invention for programming a selected circuit to full, half or non-normal and for programming the grounding of a selected circuit.

Turning particularly to FIGS. 3 and 6, it is to observed that PC board 46, which comprises a first interface, is also connected to the outboard equipment destination OED by means of cables 58 and 60 that are, in turn, connected to a jack 62. By way of example, equipment at the outboard equipment destination can comprise audio and video tape recorders and other analog or digital media equipment.

As depicted in FIG. 6, PC board 32 can be connected to a selected one of the contacts of the ten-pin header assembly 34, such as contact 36u, by a connector cable 64. Similarly, a lower contact, such as contact 36L, can be connected to PC board 32 by means of a connector cable 66. As indicated in FIG. 6 and as will be discussed more fully in the paragraphs that follow, connecting contacts 36u and 36L with a shunt will complete a signal path between the first interface and the second or rear interface thereby connecting the signal outputs from the OES and the signal inputs to the OED.

Turning to FIGS. 5A through 5K, it is to be observed that the various pins that comprise the ten-pin header assemblies 34 can be interconnected in a variety of ways to easily program a selected circuit to full, half or non-normal and also to program the grounding of a selected circuit. In this regard, the term "normalizing" as used herein means to establish or resume (circuit path) in a normal manner, as between electrical equipment. The upper portion of each of the FIGS. 5A through 5K illustrates the manner by which the various pins can be interconnected by shunts. The lower portion of each figure shows the interconnection of the leaf spring contacts of the apparatus with the sleeve, the ring and the tip of the jack Through use of the novel programming means of the invention, the user can, in the manner shown, readily alter the signal paths of both normal and grounding circuits without interrupting the system operation and without removing the patch panel from the equipment rack. It is this important aspect of the invention that distinguishes it from the prior art systems wherein altering the signal paths require system interruption and removal of the patch panel from the equipment rack.

Figure 5A:
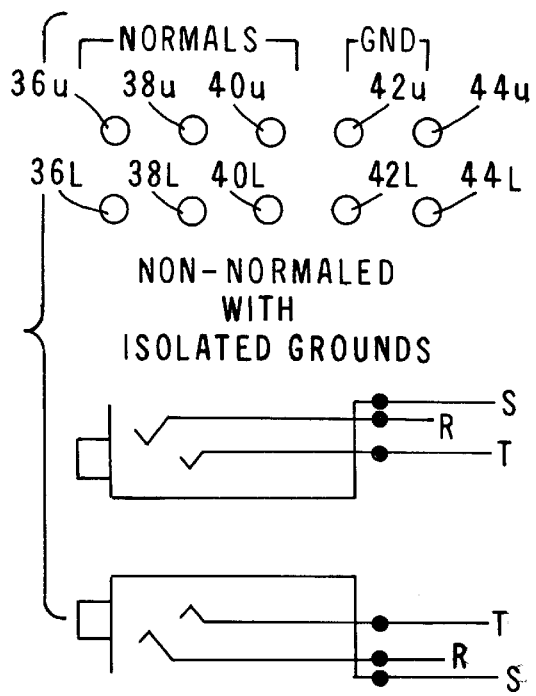
FIG 5A is a generally schematic view of a bank of contacts comprising rows of five upper and five lower contacts with no shunts connected to the contacts to provide a non-normaled with isolated ground connections.
Figure 5B:
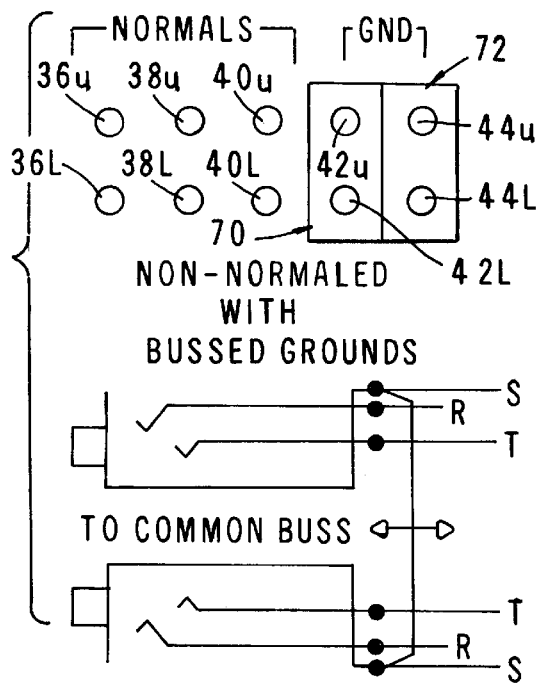
FIG. 5B is a generally schematic view of a bank of contacts with two shunts connecting the ground contacts of the bank of contacts to provide a non-normaled with bussed grounds connection.

Referring specifically to FIG. 5A, this figure depicts a non-normaled with isolated ground arrangement wherein none of the contacts or pins is interconnected by the connector means or connector shunts. FIG. 5B shows a non-normaled with bussed grounds arrangement. In this arrangement, first ground contacts 42u and 42L are interconnected by a first ground shunt 70. Similarly, second ground contacts 44u and 44L are connected by a second ground shunt 72. Ground shunts 44u and 44L comprise a part of the second programming means of the invention for programming the grounding of a selected circuit.

Referring to FIG. 5, the construction of a ground shunt, such as ground shunt 70 is there illustrated. Shunt 70 as well as all of the remaining normalizing and ground shunts of the invention comprise a body portion 70a having pin receiving connector grooves or looping contacts 70b and 70c. As indicated in FIG. 5, the contacts, or pins identified in FIG. 5, by the numeral 37 are closely received within grooves 70b and 70c so as to make electrical contact between the pins.

Figure 5C:
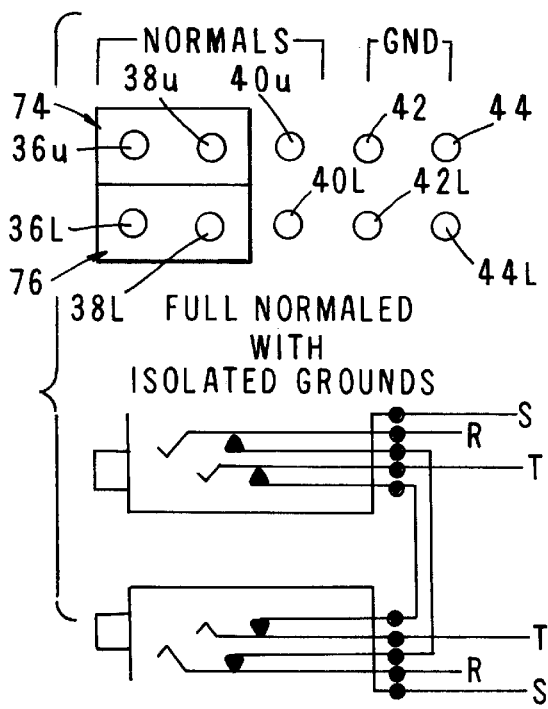
FIG. 5C is a generally schematic view of a bank of contacts with two shunts, each connecting a pair of adjacent end normals to provide a full normaled with isolated grounds connection.

Turning next to FIG. 5C, a full normaled with isolated ground arrangement is there depicted. In this arrangement, first normal contacts 36u and 38u are interconnected by a first normalizing shunt 74. Similarly, second normal contacts 36L and 38L are interconnected by means of a second normalizing shunt 76. Shunts 74 and 76, which comprise a part of the first programming means of the invention for normalizing a selected circuit, are of a similar construction to that shown in FIG. 5 and as described in the preceding paragraph.

Figure 5D:
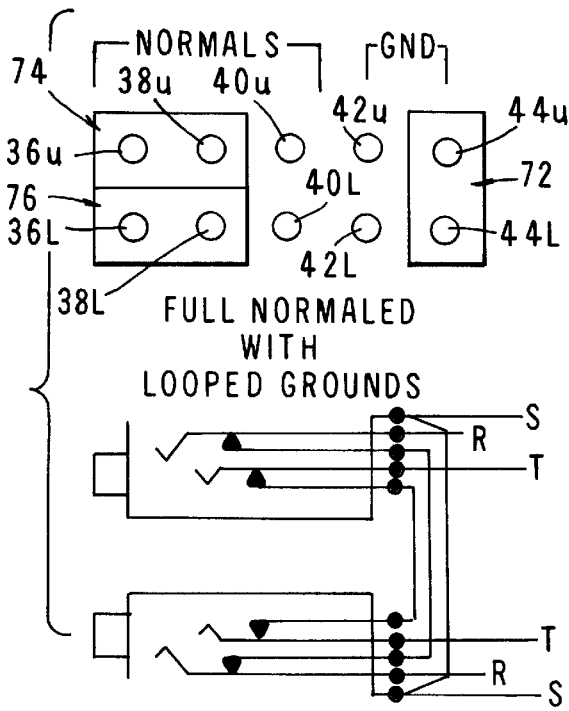
FIG. 5D is a generally schematic view of a bank of contacts with two shunts, each connected to a pair of adjacent end normals and one shunt connected to a pair of upper and lower end ground contacts to provide a full normaled with looped grounds connection.

In FIG. 5D a full normaled with loop ground arrangement is illustrated. In this arrangement, contacts 36u and 38u are once again interconnected by means of normalizing shunt 74 and contacts 36L and 38L are interconnected by normalizing shunt 76. Additionally, ground contacts 44u and 44L are interconnected by ground shunt 72.

Figure 5E:
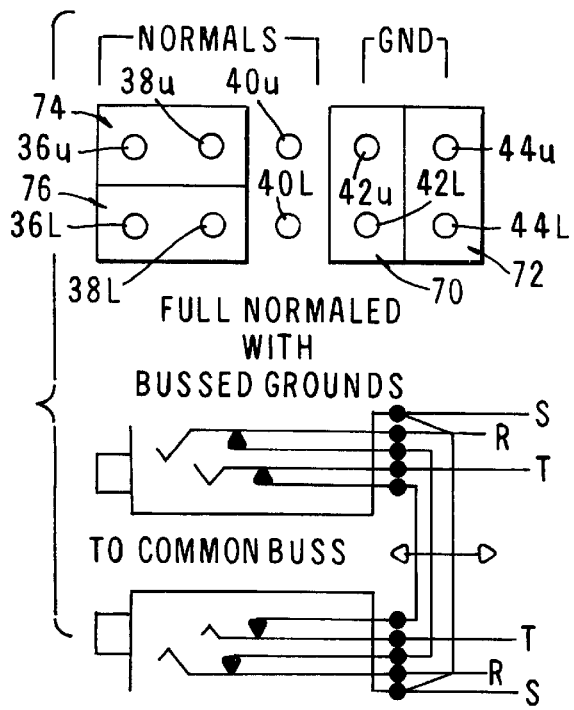
FIG. 5E is a generally schematic view of a bank of contacts with two shunts, each connected to a pair of adjacent normals and two shunts each connected to a pair of adjacent end ground contacts to provide a full normaled with bussed grounds connection.

In FIG. 5E, a full normaled with bussed grounds arrangement is illustrated. In this arrangement, pins 36u and 38u are connected by normalizing shunt 74 and contacts 36L and 38L are interconnected by normalizing shunts 76. However, in this arrangement, not only are pins 44u and 44L interconnected by a ground shunt 72, pins 44u and 44L are also interconnected by ground shunt 70.

Figure 5F:
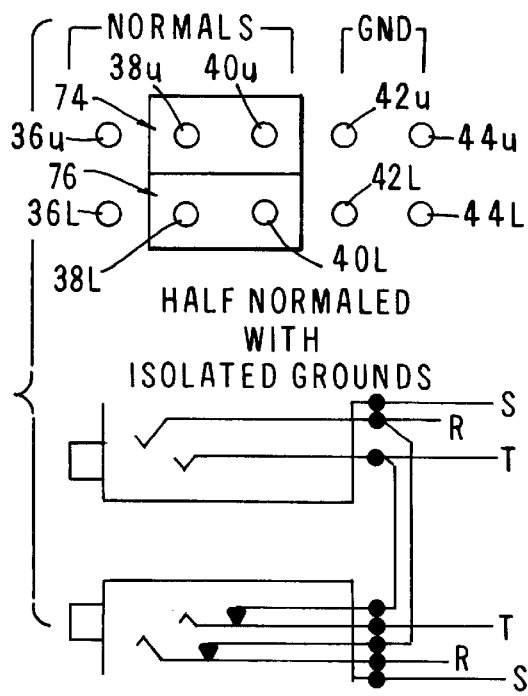
FIG. 5F is a generally schematic view of a bank of contacts with two shunts, each connected to a pair of adjacent intermediate normals to provide a half normaled with isolated grounds connection.

Turning to FIG. 5F, a half normaled with isolated grounds arrangement is depicted. In this arrangement, contacts and 38u and 40u are interconnected by normalizing shunt 74 while contact 38L and 40L are interconnected by normalizing shunt 76.

Figure 5G:
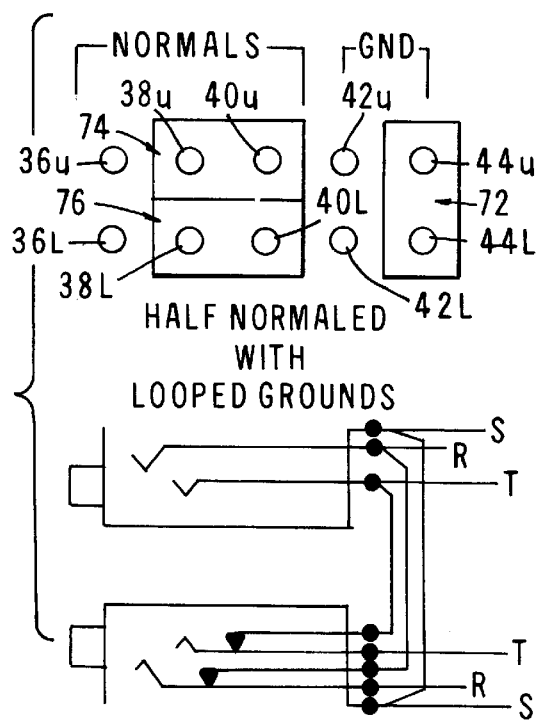
FIG. 5G is a generally schematic view of a bank of contacts with two shunts, each connected to a pair of adjacent intermediate normals and one shunt connected to a pair of upper and lower end ground contacts to provide a half normaled with looped grounds connection.

Referring to FIG. 5G a half normaled with looped grounds arrangement is there illustrated. In this arrangement, contacts 38u and 40u are once again interconnected by normalizing shunt 74 and contacts 38L and 40L are interconnected by a normalizing shunt 76. Additionally, contacts 44u and 44L are interconnected by grounding shunt 72.

Figure 5H:
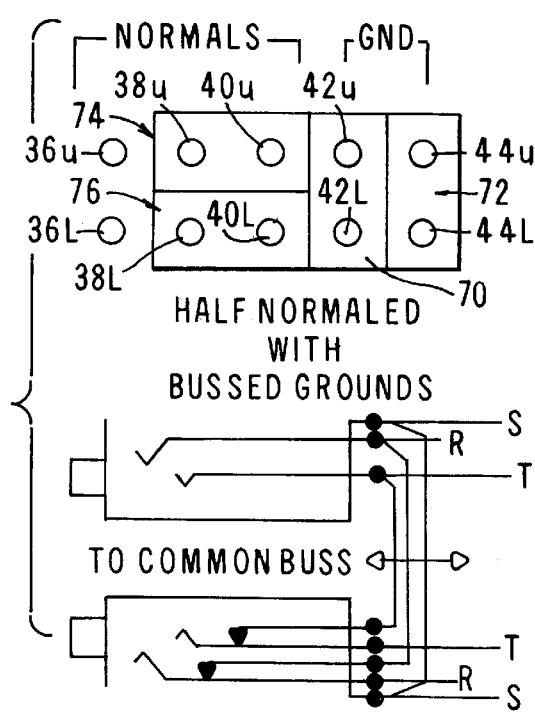
FIG. 5H is a generally schematic view of a bank of contacts with two shunts, each connecting adjacent intermediate normals and two shunts connecting the adjacent upper and lower ground contacts to provide a half normaled with bussed grounds connection.

In FIG. 5H a half normaled with bussed grounds arrangement is there depicted. In this arrangement, contacts 38u and 40u are once again interconnected by normalizing shunt 74 and contacts 38L and 40L are interconnected by normalizing shunt 76. Once again, contacts 44u and 44L are interconnected by grounding shunt 72. In this latest arrangement, however, contacts 44u and 44L are also interconnected by a grounding shunt 70.

In FIG. 5I a non-normaled with single row bussed grounds arrangement is illustrated. In this arrangement, only contacts 42L and 44L are interconnected with a ground shunt 72.

Turning to FIG. 5J, a full normaled with single row bussed grounds arrangement is illustrated. In this arrangement, contacts 36u and 38u are interconnected by means of normalizing shunt 74 and contacts 36L and 38L are interconnected by normalizing shunt 76. Additionally, in this latest arrangement, contacts 42L and 44L are interconnected by grounding shunt 72.

In FIG. 5K, a half normaled with single row bussed grounds arrangement is shown. In this arrangement, contacts 38u and 40u are interconnected by normalizing shunt 74, while contacts 38L and 40L are interconnected by normalizing shunt 76. Additionally, contacts 42L and 44L are interconnected by a grounding shunt 72.

As best seen by referring to FIG. 2, wherein the indicator strips 30 have been broken away from panel 24 to show internal construction, the transversely spaced-apart ten-pin headers are exposed and can be seen to be readily accessible from the front of panel 24. Accordingly, shunts such as the previously identified shunts 72, 74, and 76 can be manipulated in the manner earlier discussed to interconnect selected pairs of contacts or pins such as pins 38u and 40u, pins 38L and 40L, and pins 44u and 44L. Various other normalizing and grounding connections can, of course, be made in a manner illustrated in FIG. 2 by appropriate manipulation of the connector means or shunts of the invention.

From a study of FIGS. 2 and 6, it is readily apparent that when the various jacks of the apparatus are interconnected with the front and rear PC boards in the manner shown by way of example in FIG. 6 and, when the front panel PC board 32 is interconnected with selected contacts of the ten-pin header assemblies, a plurality of the various circuits carried by the apparatus can be interconnected to complete various signal paths between outboard equipment sources and outboard equipment destinations. This unique feature of the apparatus of the invention provides great versatility and ease of circuit altering to the user of the apparatus without requiring equipment shutdown and removal of the patch panels from the equipment rack.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

What is claimed is:

1. A patch panel having a front panel comprising:
    (a) a signal input;
    (b) a signal output connected to said signal input;
    (c) a plurality of first normalizing contacts connected to said signal input and being accessible from said front panel;
    (d) a plurality of first grounding contacts connected to said signal input and being accessible from said front panel;
    (e) a plurality of second normalizing contacts connected to said signal output and being accessible from said front panel;
    (f) a plurality of second grounding contacts connected to said signal output and being accessible from said front panel;
    (g) first connector means for interconnecting a selected pair of said first and second grounding contacts; and
    (h) a second connector means for interconnecting a selected pair of said first and second normalizing pins.

2. The patch panel as defined in claim 1 in which said normalizing contacts comprise normalizing pins and in which said ground contacts comprise grounding pins.

3. The patch panel as defined in claim 1 in which said first connector means comprises at least one ground shunt.

4. The patch panel as defined in claim 1 in which said second connector means comprises at least one normalizing shunt.

5. The patch panel as defined in claim 1 comprising six normalizing contacts and four grounding contacts.

6. The patch panel as defined in claim 5 in which said connector means comprises three normalizing shunts and two grounding shunts.

7. A programmable patch panel comprising a chassis having a front panel and including:
 (a) a plurality of electrical circuits carried by said front panel;
 (b) a plurality of spaced-apart first normalizing contacts and a plurality of spaced-apart first ground contacts connected to a selected electrical circuit;
 (c) a plurality of spaced-apart second normalizing contacts and a plurality of spaced-apart second ground contacts connected to said selected electrical circuit;
 (d) first programming means for programming said selected circuits to full, half or non-normal, said first programming means comprising:
  (i) a first normalizing shunt connected to a selected first pair of said first and second normalizing contacts;
  (ii) a second normalizing shunt connected to a selected second pair of said first and second normalizing contacts; and
 (e) second programming means for programming the grounding of said selected circuit, said second programming means comprising:
  (i) a first ground shunt connected to a selected first pair of first and second ground contacts; and
  (ii) a second ground shunt connected to a selected second pair of first and second ground contacts.

8. The programmable patch panel as defined in claim 7 in which said patch panel includes six normalizing contacts and four ground contacts connected to selected circuits.

9. The programmable patch panel as defined in claim 8 in which each of said contacts comprises a pin.

10. The programmable patch panel as defined in claim 9 in which each of said shunts comprises a body portion having a plurality of looping contacts for receiving said pins.

\* \* \* \* \*